US007880721B2

(12) United States Patent
Suzuki et al.

(10) Patent No.: US 7,880,721 B2
(45) Date of Patent: Feb. 1, 2011

(54) WAVE RECEIVING DEVICE AND METHOD OF DETERMINING WAVE RECEPTION

(75) Inventors: Kenji Suzuki, Tokyo (JP); Hiroyuki Kobayashi, Tokyo (JP); Syuuji Murayama, Tokyo (JP); Kenji Inamoto, Tokyo (JP)

(73) Assignee: NEC Viewtechnology, Ltd., Tokyo (JP)

( * ) Notice: Subject to any disclaimer, the term of this patent is extended or adjusted under 35 U.S.C. 154(b) by 1248 days.

(21) Appl. No.: 11/350,926

(22) Filed: Feb. 10, 2006

(65) Prior Publication Data
US 2006/0195274 A1  Aug. 31, 2006

(30) Foreign Application Priority Data
Feb. 25, 2005  (JP)  ............................. 2005-051060

(51) Int. Cl.
G09G 5/08 (2006.01)
(52) U.S. Cl. ....................................... 345/157; 345/179
(58) Field of Classification Search ......... 345/173–179; 702/39
See application file for complete search history.

(56) References Cited

U.S. PATENT DOCUMENTS

| 3,995,272 | A  | * | 11/1976 | Prill ............................. 342/399 |
| 4,490,716 | A  | * | 12/1984 | Tsuda et al. ................. 340/904 |
| 5,631,875 | A  | * | 5/1997  | Romes et al. ................. 367/99 |
| 6,457,364 | B1 | * | 10/2002 | Howell ......................... 73/602 |
| 6,717,129 | B1 | * | 4/2004  | Mizuhara et al. ........ 250/214 R |
| 7,075,524 | B2 | * | 7/2006  | Kobayashi et al. ........... 345/173 |
| 7,437,960 | B2 | * | 10/2008 | Priebsch ..................... 73/865.8 |
| 2001/0000666 | A1 | * | 5/2001 | Wood et al. .................. 345/179 |
| 2002/0101412 | A1 | * | 8/2002 | Tasaki .......................... 345/179 |
| 2002/0130850 | A1 | * | 9/2002 | Kobayashi et al. .......... 345/180 |
| 2003/0144814 | A1 | * | 7/2003 | Hama et al. .................. 702/159 |
| 2005/0200613 | A1 | * | 9/2005 | Kobayashi et al. .......... 345/175 |

FOREIGN PATENT DOCUMENTS

| JP | 2000-214258 | 8/2000 |
| JP | 2001-125741 | 5/2001 |
| JP | 2003-222675 | 8/2003 |
| JP | 2004-272636 | 9/2004 |

OTHER PUBLICATIONS

Japanese Office Action with a Partial English Translation dated on Apr. 2, 2008.
European Search Report dated Jan. 24, 2008, with English translation.

* cited by examiner

Primary Examiner—Alexander Eisen
Assistant Examiner—Nelson Lam
(74) Attorney, Agent, or Firm—McGinn Intellectual Property Law Group, PLLC

(57) ABSTRACT

An ultrasonic receiver receives an ultrasonic signal having a period in which an amplitude thereof progressively increases as time elapses. A pattern matching unit determines whether a comparative pattern, which is generated as a result of comparison between the respective maximum amplitude values of a plurality of successive waves of said wave signal and a threshold value set by a threshold setting unit, matches a reference pattern or not during the period of the ultrasonic signal. The pattern matching unit determines that the ultrasonic receiver has successfully received the ultrasonic signal if the comparative pattern matches the reference pattern.

34 Claims, 11 Drawing Sheets

WAVE RECEIVING DEVICE AND METHOD OF DETERMINING WAVE RECEPTION

BACKGROUND OF THE INVENTION (1) Field of the Invention

The present invention relates to a wave receiving device for use in a system for measuring a distance up to an object using a wave signal represented by a sound signal including an ultrasonic signal, and a method of determining the reception of a wave signal, which is to be performed in such a wave receiving device.

(2) Description of the Related Art

There have been presented various presentation systems utilizing projectors. One of the known presentation systems is an electronic presentation system for enabling the user to write information such as characters on an image projected by the projector, using a pointing device such as an electronic pen or the like. The electronic presentation system detects the position of the pointing device on the projected image according to an ultrasonic distance measurement process.

JP-A 2001-125741 discloses a presentation system wherein a pointing rod as a pointing device has on its tip end an ultrasonic transmitter for transmitting an ultrasonic signal, and ultrasonic receivers disposed in at least three reference positions on a screen receive the ultrasonic signal transmitted by the ultrasonic transmitter. The position of the tip end of the pointing rod on the screen is detected based on the difference between the arrival times of the ultrasonic signal measured by the respective ultrasonic receivers, i.e., the times consumed until the ultrasonic signal transmitted by the ultrasonic transmitter reaches the ultrasonic receivers.

There is also known a system wherein a plurality of receivers for receiving an ultrasonic signal from an electronic pen are provided on a projector. The three-dimensional position of the electronic pen on a screen is measured based on the difference between the arrival times of the ultrasonic signal that are measured by the respective receivers.

In electronic presentation systems as described above, a conventional ultrasonic receiving device determines that it has received the ultrasonic signal simply when the amplitude of the ultrasonic signal exceeds a threshold value. Therefore, the ultrasonic receiving device suffers the following problems:

The ultrasonic receiving device has its received signal level variable depending on the distance from itself to the ultrasonic transmitting device. If the ultrasonic transmitting device has an ultrasonic transmitter on its tip end, like an electronic pen, then the ultrasonic transmitting device has an ultrasonic signal radiating pattern which is lower in level at a rear end thereof. In this case, the received signal level in the ultrasonic receiver varies depending on the orientation of the ultrasonic transmitting device with respect to the ultrasonic receiver.

FIG. 1 of the accompanying drawings schematically shows the determination of ultrasonic signal reception timing in a conventional ultrasonic receiving device at the time the received signal level varies. FIG. 1 illustrates the waveform of a received ultrasonic signal when its amplitude is normal at (a) and also illustrates the waveform of a received ultrasonic signal when its amplitude is doubled at (b). When the amplitude of the received ultrasonic signal is normal as shown at (a) in FIG. 1, since the level of noise N (disturbance noise) is smaller than a threshold value T, the ultrasonic signal reception timing can be determined by comparing the amplitude of a first wave with the threshold value T. However, when amplitude of the received ultrasonic signal is not normal as shown at (b) in FIG. 1, since the level of noise N is substantially the same as the threshold value T, the ultrasonic signal reception timing may possibly be determined in error due to the noise N.

The ultrasonic receiver is basically similar in structure to a microphone. Consequently, the ultrasonic receiver tends to detect sporadic noise or a wide range of noise, e.g., voice, the sound of a closing door, or noise generated when a display monitor is turned on, etc. If any of these noises is contained in the received ultrasonic signal, then the ultrasonic signal reception timing may possibly be determined in error.

As described above, the conventional ultrasonic receiving devices are problematic in that they may possibly determine the ultrasonic signal reception timing in error and may possibly operate erroneously due to noise.

SUMMARY OF THE INVENTION

It is an object of the present invention to provide a wave receiving apparatus and a method of determining the reception of a wave signal for accurately determining ultrasonic signal reception timing.

To achieve the above object, according to the present invention, when a wave signal having a period in which an amplitude thereof progressively increases as time elapses is received by a receiver, it is determined that the receiver has successfully received the wave signal based on a comparative pattern and a threshold value, the comparative pattern being generated as a result of comparison between respective amplitude values of a plurality of successive waves of the wave signal. Specifically, based on the physical characteristics of an ultrasonic transmitting element, i.e., based on the fact that the amplitude of an ultrasonic signal generated thereby progressively increases with time for a certain period of time until its operation becomes stabilized after it has started to operate, an ultrasonic signal having a period in which an amplitude thereof progressively increases as time elapses is received by an ultrasonic receiver of an ultrasonic receiving device. When the ultrasonic signal is received by the ultrasonic receiver, a pattern matching unit of the ultrasonic receiving device determines whether a comparative pattern matches a preset reference pattern or not, the comparative pattern being generated as a result of comparison between respective amplitude values of a plurality of successive waves of the ultrasonic signal. If the comparative pattern matches the reference pattern, then the pattern matching unit determines that the ultrasonic receiver has successfully received the ultrasonic signal.

With the above arrangement, if the received ultrasonic signal contains noise tending to cause a malfunction, e.g., noise N shown in FIG. 1, sporadic noise, or a wide range of noise, then since the comparative pattern does not match the reference pattern, ultrasonic signal reception timing is not determined in error.

According to the present invention, because ultrasonic signal reception timing is not determined in error because of noise, ultrasonic signal reception timing can be determined accurately, and the ultrasonic receiving device is prevented from operating erroneously.

The above and other objects, features, and advantages of the present invention will become apparent from the following description with reference to the accompanying drawings which illustrate examples of the present invention.

BRIEF DESCRIPTION OF THE DRAWINGS

In the accompanying drawings.

DETAILED DESCRIPTION OF THE PREFERRED EMBODIMENTS

Figure 1:
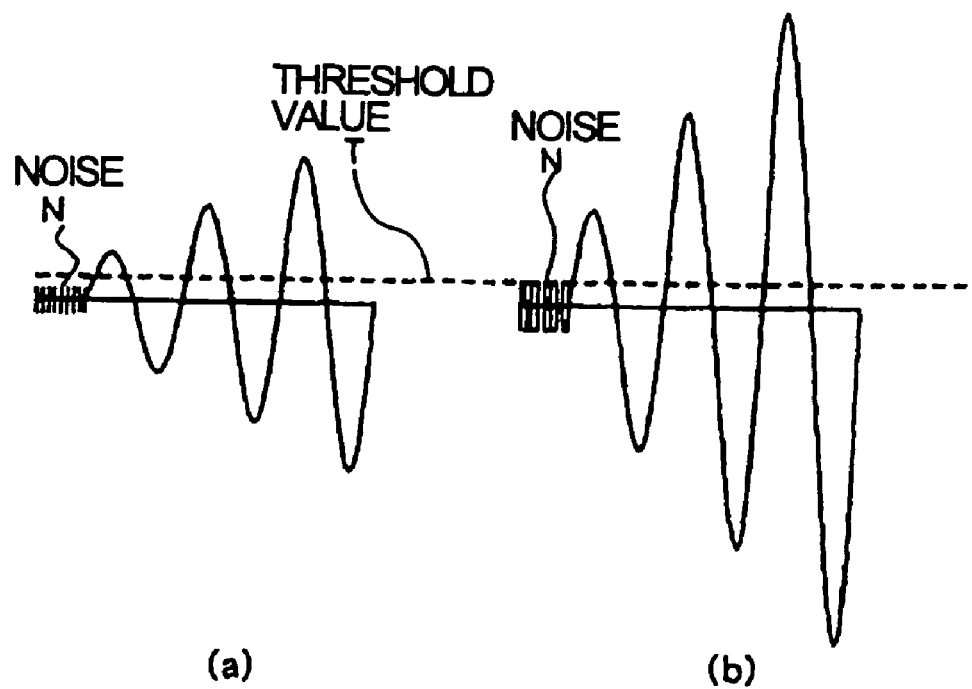
FIG. 1 is a diagram illustrative of the manner in which a conventional ultrasonic receiving device operates to determine ultrasonic signal reception timing.

Like or corresponding parts are denoted by like or corresponding reference characters throughout views.

1st Embodiment

Figure 2:
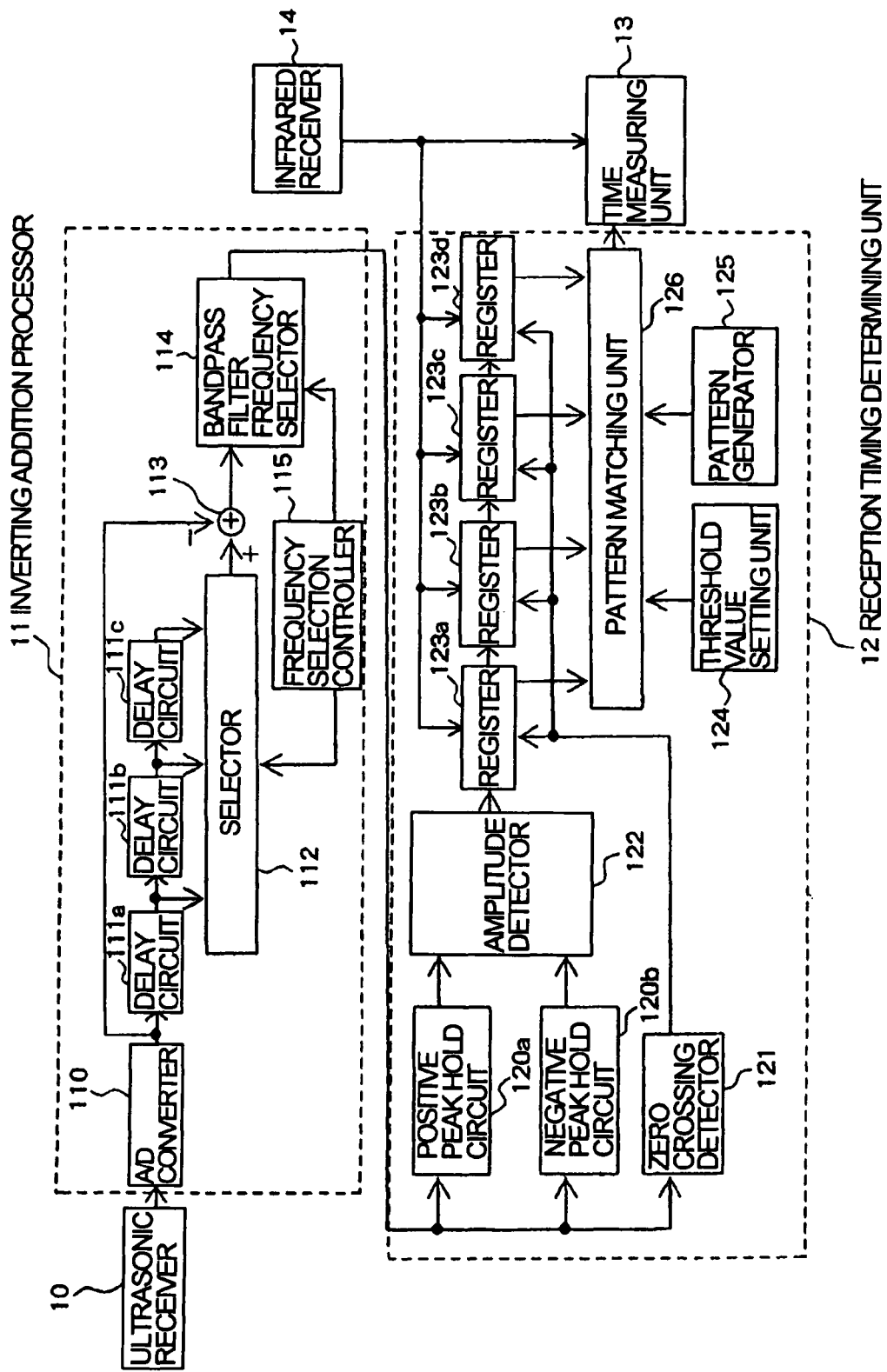
FIG. 2 is a block diagram of an ultrasonic receiving device according to a first embodiment of the present invention.

FIG. 2 shows in block form an ultrasonic receiving device according to a first embodiment of the present invention. The ultrasonic receiving device is adapted to be used in a distance measuring system for measuring the distance up to an object using an ultrasonic signal. The ultrasonic receiving device basically comprises ultrasonic receiver 10, inverting addition processor 11, reception timing determining unit 12, time measuring unit 13, and infrared receiver 14.

Ultrasonic receiver 10 serves to receive an ultrasonic signal that is transmitted in cyclic periods from a transmitting device (not shown), which is to be measured. Ultrasonic receiver 10 supplies an output signal to inverting addition processor 11.

The transmitting device also transmits an infrared signal (pulse signal) in cyclic periods. The cyclic periods of the ultrasonic signal are determined based on the cyclic periods of the infrared signal. The infrared signal transmitted from the transmitting device is received by infrared receiver 14.

Inverting addition processor 11 converts the ultrasonic signal (analog signal) received by ultrasonic receiver 10 into a digital signal, and performs an inverting addition on the digital ultrasonic signal. Inverting addition processor 11 comprises A/D converter 110, a plurality of delay circuits 111a, 111b, 111c, selector 112, adder 113, bandpass filter frequency selector 114, and frequency selection controller 115. The inverting addition refers to a process of adding the original received ultrasonic signal and an ultrasonic signal which has been delayed a half wave (half phase) from the original received ultrasonic signal and whose sign has been inverted.

A/D converter 110 serves to convert the ultrasonic signal (analog signal) output from ultrasonic receiver 10 into a digital signal. A/D converter 110 outputs the digital signal to a negative input terminal of adder 113 and also to delay circuit 111a.

Delay circuits 111a, 111b, 111c delay an input signal by a certain time interval. Delay circuit 111a supplies its delayed output signal to delay circuit 111b and also to a first input terminal of selector 112. Delay circuit 111b supplies its delayed output signal to delay circuit 111c and also to a second input terminal of selector 112. Delay circuit 111c supplies its delayed output signal to a third input terminal of selector 112.

Based on a frequency selection signal from frequency selection controller 115, selector 112 selects either one of the signals supplied to its first through third input terminals and outputs the selected signal to a positive input terminal of adder 113. Adder 113 adds the output signal from A/D converter 110 and the output signal from selector 112 to each other. Adder 113 supplies its output sum signal to bandpass filter frequency selector 114. Though inverting addition processor 11 is shown as having three delay circuits 111a through 111c in FIG. 2, inverting addition processor 11 is not limited to having three delay circuits, but may be designed to have more or less delay circuits.

Figure 3:
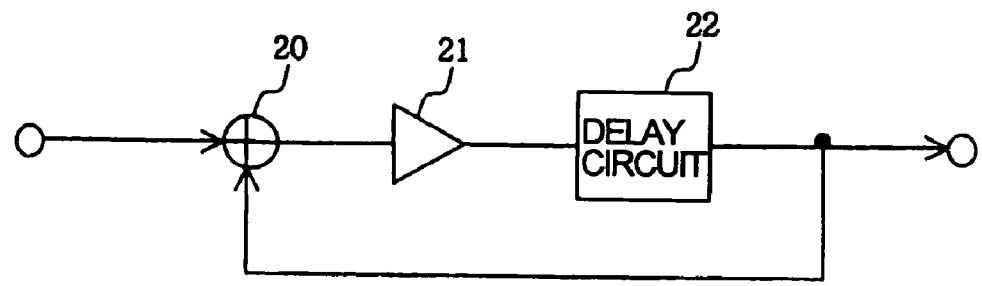
FIG. 3 is a block diagram of an IIR filter.

Bandpass filter frequency selector 114 comprises a plurality of bandpass filters each typified by an IIR filter or an FIR filter. FIG. 3 shows an IIR filter by way of example. As shown in FIG. 3, the IIR filter comprises adder 20, amplifier 21 for amplifying an output signal from adder 20, and delay circuit 22 for delaying an output signal from amplifier 21 by a certain time interval. Delay circuit 22 supplies a branched delayed output signal to an input terminal of adder 20. Bandpass filter frequency selector 114 comprises a cascade of IIR filters as shown in FIG. 3. Bandpass filter frequency selector 114 selects a combination of cascaded IIR filters based on the frequency selection signal from frequency selection controller 115.

Frequency selection controller 115 controls the selection of an input signal in selector 112 and the selection of a frequency in bandpass filter frequency selector 114. The user of the ultrasonic receiving device can set a delay interval and a frequency in frequency selection controller 115 through an input unit, not shown. Depending on the delay interval and the frequency that have been set by the user, frequency selection controller 115 controls the selection of an input signal in selector 112 and the selection of a frequency in bandpass filter frequency selector 114.

In FIG. 2, reception timing determining unit 12 serves to determine ultrasonic signal reception timing in each cyclic period based on the received ultrasonic signal that has been processed by inverting addition processor 11. Reception timing determining unit 12 comprises positive peak hold circuit 120a, negative peak hold circuit 120b, zero crossing detector 121, amplitude detector 122, a plurality of registers 123a through 123d, threshold value setting unit 124, pattern generator 125, and pattern matching unit 126.

The output signal from bandpass filter frequency selector 114 is supplied to both positive peak hold circuit 120a and negative peak hold circuit 120b. Positive peak hold circuit 120a holds the peak value of the positive amplitude of the ultrasonic signal. Negative peak hold circuit 120b holds the peak value of the negative amplitude of the ultrasonic signal. Positive peak hold circuit 120a and negative peak hold circuit 120b supply respective output signals to amplitude detector 122.

Zero crossing detector 121 serves to detect a point (zero crossing point) where the ultrasonic signal changes from a positive level to a negative level and from a negative level to a positive level. Zero crossing detector 121 outputs a pulse signal when it detects a zero crossing point. The output pulse signal from zero crossing detector 121 is supplied as a hold timing signal to each of registers 123a through 123d.

Amplitude detector 122 serves to detect an amplitude value in one period of the ultrasonic signal, which is represented by the sum of a positive amplitude and a negative amplitude. Amplitude detector 122 outputs a signal representing the sum of the amplitude value held by positive peak hold circuit 120a and the amplitude value (absolute value) held by negative peak hold circuit 120b. The signal output from amplitude detector 122 is supplied to register 123a.

Each of registers 123a through 123d holds the value of an input signal based on the hold timing signal from zero crossing detector 121. Register 123a supplies its output signal to an input terminal of register 123b. Register 123b supplies its output signal to an input terminal of register 123c. Register 123c supplies its output signal to an input terminal of register 123d. Registers 123a through 123d jointly make up a shift register which supplies the values of registers 123a through 123d to pattern matching unit 126 each time these values are shifted. Pattern matching unit 126 duplicates the values of registers 123a through 123d and holds them for one period.

Threshold value setting unit 124 holds a preset threshold value (fixed value), and supplies the held threshold value to pattern matching unit 126. The user can set a threshold value in threshold value setting unit 124 through an input unit, not shown. Threshold value setting unit 124 holds the threshold value that has been set by the user.

Pattern generator 125 generates a preset reference pattern. The reference pattern is represented by a bit pattern made up of 0s and 1s. The user can set a reference pattern in pattern generator 125 through an input unit, not shown. The number of bits of the reference pattern is determined by the number of registers 123a through 123d. Since there are four registers 123a through 123d in FIG. 2, the reference pattern comprises four bits.

Pattern matching unit 126 compares each of the amplitude values held respective by registers 123a through 123d with the threshold value supplied from threshold value setting unit 124 each time the amplitude values held respective by registers 123a through 123d are shifted. Then, pattern matching unit 126 generates a 4-bit comparative pattern of 0s and 1s where "0" occurs if the amplitude value of each register is smaller than the threshold value and "1" if the amplitude value of each register is greater than the threshold value. Pattern matching unit 126 compares the generated comparative pattern with the reference pattern supplied from pattern generator 125. If the comparative pattern matches the reference pattern, then pattern matching unit 126 determines that an ultrasonic signal has been received, and outputs an ultrasonic signal reception timing signal (pulse signal). The ultrasonic signal reception timing signal output from pattern matching unit 126 is supplied to time measuring unit 13. Though reception timing determining unit 12 is shown as having four registers 123a through 123d in FIG. 2, reception timing determining unit 12 is not limited to having four registers, but may be designed to have more or less registers. If reception timing determining unit 12 has five registers, then each of the comparative pattern and the reference pattern comprises a 5-bit pattern.

When infrared receiver 14 receives the infrared signal from the transmitting device, infrared receiver 14 outputs a pulse signal indicative of the reception timing of the infrared signal. Infrared receiver 14 supplies the output pulse signal as an infrared signal reception timing signal to time measuring unit 13 and also supplies the output pulse signal as a reset signal to registers 123a through 123d. Time measuring unit 13 measures a period of time that elapses after it has received the infrared signal reception timing signal from infrared receiver 14 until it receives the ultrasonic signal reception timing signal from pattern matching unit 126.

The period of the infrared signal received by infrared receiver 14 is 30 msec., for example. The frequency of the ultrasonic signal received by ultrasonic receiver 10 is several tens kHz. Inverting addition processor 11, reception timing determining unit 12, and time measuring unit 13 operate at a system clock whose frequency is sufficiently higher than the frequency of the received ultrasonic signal. The system clock frequency is 10 MHz, for example.

Operation of the ultrasonic receiving device according to the first embodiment will be described below.

The transmitting device, which is to be measured, transmits an infrared signal in cyclic periods, and also transmits an ultrasonic signal in cyclic periods that are determined by the cyclic periods of the infrared signal. An ultrasonic transmitting element (oscillating element) has such physical characteristics that the amplitude of an ultrasonic signal generated thereby progressively increases with time for a certain period of time until its operation becomes stabilized after it has started to operate. The ultrasonic receiving device according to the first embodiment determines the reception of an ultrasonic signal based on such physical characteristics of the ultrasonic transmitting element.

(1) Operation of Inverting Addition Processor 11:

The infrared and ultrasonic signals transmitted from the transmitting device are received respectively by infrared receiver 14 and ultrasonic receiver 10. The ultrasonic signal received by ultrasonic receiver 10 is supplied to inverting addition processor 11.

In inverting addition processor 11, A/D converter 110 converts the ultrasonic signal supplied from ultrasonic receiver 10 into a digital signal. The digital ultrasonic signal is supplied as an original ultrasonic signal to the negative input terminal of adder 113 and also supplied to delay circuits 111a through 111c. The ultrasonic signal supplied to delay circuits 111a through 111c is delayed a half period (half phase) or one period (one phase) from the original ultrasonic signal. The delayed ultrasonic signals from delay circuits 111a through 111c are supplied to selector 112, which selects one of the delayed ultrasonic signals and supplies the selected delayed ultrasonic signal to the positive input terminal of adder 113. Adder 113 adds the original ultrasonic signal as inverted and the delayed ultrasonic signal to each other. Adder 113 supplies its sum signal to bandpass filter frequency selector 114, which selects only a received ultrasonic signal frequency component. The received ultrasonic signal that has passed through bandpass filter frequency selector 114 is supplied to reception timing determining unit 12.

Figure 4:
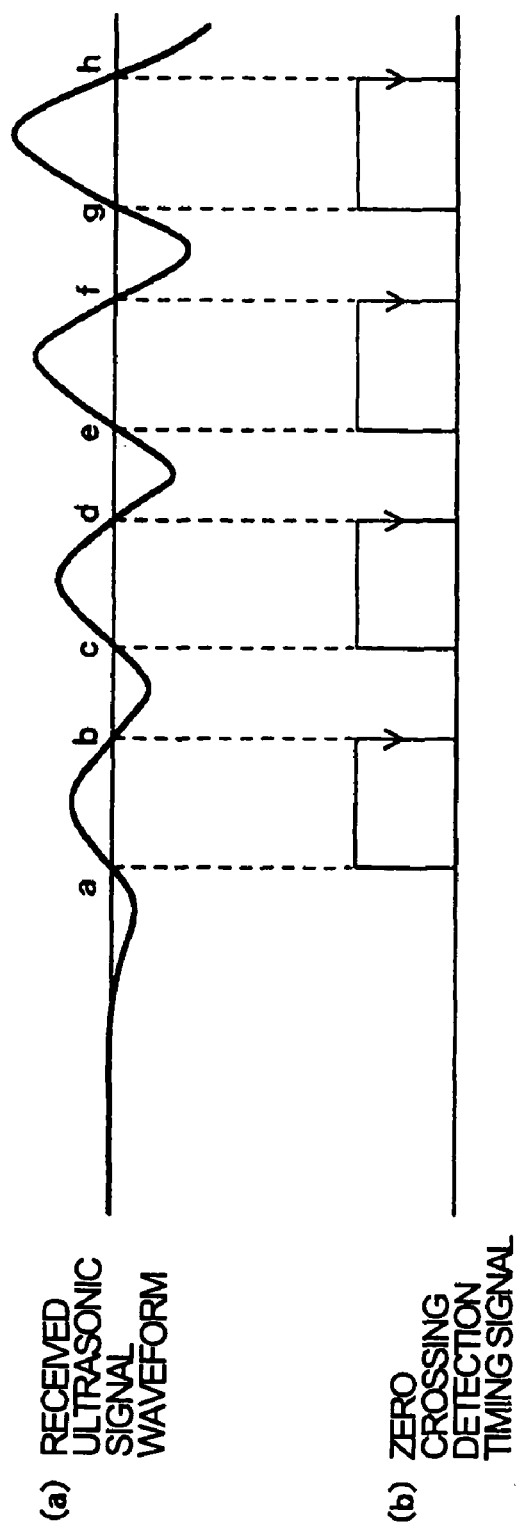
FIG. 4 is a diagram illustrative of a zero crossing detecting process.

(2) Operation of Reception Timing Determining Unit 12:

In reception timing determining unit 12, the received ultrasonic signal from inverting addition processor 11 is supplied to positive peak hold circuit 120a, negative peak hold circuit 120b, and zero crossing detector 121. Zero crossing detector 121 supplies a zero crossing detection timing signal, which represents a detected zero crossing point of the received ultrasonic signal from inverting addition processor 11, to each of registers 123a through 123d. FIG. 4 schematically illustrates a zero crossing detecting process.

It is assumed that a delay unit made up of delay circuits 111a through 111c delays the original ultrasonic signal by a half period (half phase). FIG. 4 shows the waveform of the received ultrasonic signal at (a) and also shows the zero crossing detection timing signal at (b). The waveform of the received ultrasonic signal is a sinusoidal waveform having alternate negative and positive levels which start with a negative level. FIG. 4 shows zero crossing points a through h of first through fourth waves whose amplitude increases with time. The zero crossing detection timing signal comprises a pulse signal having positive-going edges respectively at first zero crossing point a where the first wave changes from the negative level to the positive level, zero crossing point c where the second wave changes from the negative level to the positive level, zero crossing point e where the third wave changes from the negative level to the positive level, and zero crossing point g where the fourth wave changes from the negative level to the positive level, and also having negative-going edges respectively at zero crossing point b where the positive level of the first wave changes to the negative level of the second wave, zero crossing point d where the positive level of the second wave changes to the negative level of the third wave, zero crossing point f where the positive level of the third wave changes to the negative level of the fourth wave, and zero crossing point h where the positive level of the fourth wave changes to the negative level of the fifth wave.

If the delay unit made up of delay circuits 111a through 111c delays the original ultrasonic signal by half period (half phase), then since the waveform of the received ultrasonic signal has its amplitude increasing with time, when the amplitude of the second wave is twice the amplitude of the first wave or greater, the amplitude of the received ultrasonic signal increases with time, as shown in FIG. 4. Because the original ultrasonic signal and the delayed ultrasonic signal are in phase with each other, the output signal from inverting addition processor 11 represents the difference between waveforms that are one period shifted from each other after receiving the second wave. Therefore, noise having the same frequency component as the ultrasonic signal, which cannot be canceled out by delaying the ultrasonic signal by the half period, can be canceled out. The delayed interval may be adjusted to a half period or a one period by delay circuits 111a through 111c.

Operation of positive peak hold circuit 120a, negative peak hold circuit 120b, amplitude detector 122, and registers 123a through 123d will be described below with reference to FIG. 4.

In the first period of the received ultrasonic signal waveform, the peak value of the negative amplitude of the first wave is held by negative peak hold circuit 120b, and the peak value of the positive amplitude of the first wave is held by positive peak hold circuit 120a. Amplitude detector 122 supplies a first amplitude value, which represents the sum of the peak values (absolute values) of the amplitudes that are held respectively by positive peak hold circuit 120a and negative peak hold circuit 120b, to register 123a. Register 123a holds the first amplitude value supplied from amplitude detector 122 in synchronism with the first negative-going edge (corresponding to zero crossing point b) of the zero crossing detection timing signal from zero crossing detector 121. At this time, other registers 123b through 123d have been reset.

In the second period of the received ultrasonic signal waveform, the peak value of the negative amplitude of the second wave is held by negative peak hold circuit 120b, and the peak value of the positive amplitude of the second wave is held by positive peak hold circuit 120a. Amplitude detector 122 supplies a second amplitude value, which represents the sum of the peak values (absolute values) of the amplitudes that are held respectively by positive peak hold circuit 120a and negative peak hold circuit 120b, to register 123a. Register 123a holds the second amplitude value supplied from amplitude detector 122 in synchronism with the second negative-going edge (corresponding to zero crossing point d) of the zero crossing detection timing signal from zero crossing detector 121. Simultaneously, register 123b holds the first amplitude value that has been held by register 123a. At this time, other registers 123c, 123d have been reset.

In the third period of the received ultrasonic signal waveform, the peak value of the negative amplitude of the third wave is held by negative peak hold circuit 120b, and the peak value of the positive amplitude of the third wave is held by positive peak hold circuit 120a. Amplitude detector 122 supplies a third amplitude value, which represents the sum of the peak values (absolute values) of the amplitudes that are held respectively by positive peak hold circuit 120a and negative peak hold circuit 120b, to register 123a. Register 123a holds the third amplitude value supplied from amplitude detector 122 in synchronism with the third negative-going edge (corresponding to zero crossing point f) of the zero crossing detection timing signal from zero crossing detector 121. Simultaneously, register 123b holds the second amplitude value that has been held by register 123a, and register 123c holds the first amplitude value that has been held by register 123b. At this time, other register 123d has been reset.

In the fourth period of the received ultrasonic signal waveform, the peak value of the negative amplitude of the fourth wave is held by negative peak hold circuit 120b, and the peak value of the positive amplitude of the fourth wave is held by positive peak hold circuit 120a. Amplitude detector 122 supplies a fourth amplitude value, which represents the sum of the peak values (absolute values) of the amplitudes that are held respectively by positive peak hold circuit 120a and negative peak hold circuit 120b, to register 123a. Register 123a holds the fourth amplitude value supplied from amplitude detector 122 in synchronism with the fourth negative-going edge (corresponding to zero crossing point h) of the zero crossing detection timing signal from zero crossing detector 121. Simultaneously, register 123b holds the third amplitude value that has been held by register 123a, register 123c holds the second amplitude value that has been held by register 123b, and register 123d holds the first amplitude value that has been held by register 123c.

As described above, the amplitude values detected in the respective periods of the received ultrasonic signal waveform are successively held by registers 123a through 123d. According to the illustrated first embodiment, since there are four registers older amplitude values that have been held are successively deleted in fifth and subsequent periods of the received ultrasonic signal waveform. Therefore, copies of those older amplitude values are stored in pattern matching unit 126.

Figure 5:
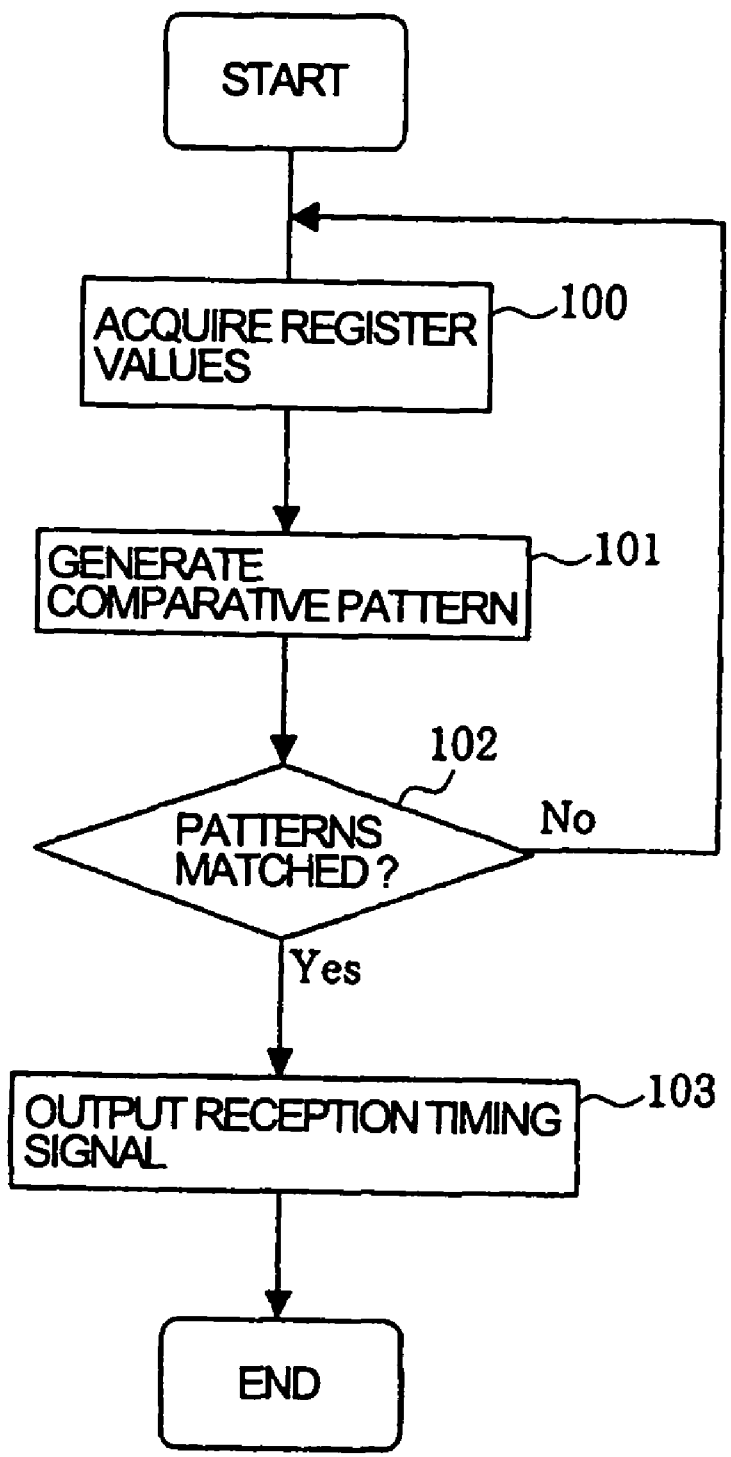
FIG. 5 is a flowchart of a sequence for determining ultrasonic signal reception timing, which is performed by the ultrasonic receiving device shown in FIG. 2.

After the amplitude values detected in the respective periods of the received ultrasonic signal waveform are held by registers 123a through 123d, pattern matching unit 126 determines ultrasonic signal reception timing. FIG. 5 shows a sequence for determining ultrasonic signal reception timing, as performed by pattern matching unit 126.

As shown in FIG. 5, pattern matching unit 126 acquires the register values (the held amplitude values) from respective registers 123a through 123d in step 100. Then, pattern matching unit 126 compares the acquired register values with the threshold value supplied from threshold value setting unit 124, and generates a 4-bit comparative pattern of 0s and 1s where "0" occurs if the register value is smaller than the threshold value and "1" if the register value is greater than the threshold value, in step 101. Pattern matching unit 126 then determines whether the generated comparative pattern matches the 4-bit reference pattern supplied from pattern generator 125 in step 102. If the comparative pattern does not match the reference pattern, then control goes back to step 100 to acquire the register values from respective registers 123a through 123d after the register values have been shifted. If the comparative pattern matches the reference pattern, then pattern matching unit 126 determines that an ultrasonic signal has been received, and outputs an ultrasonic signal reception timing signal (pulse signal) in step 103.

Figure 6:
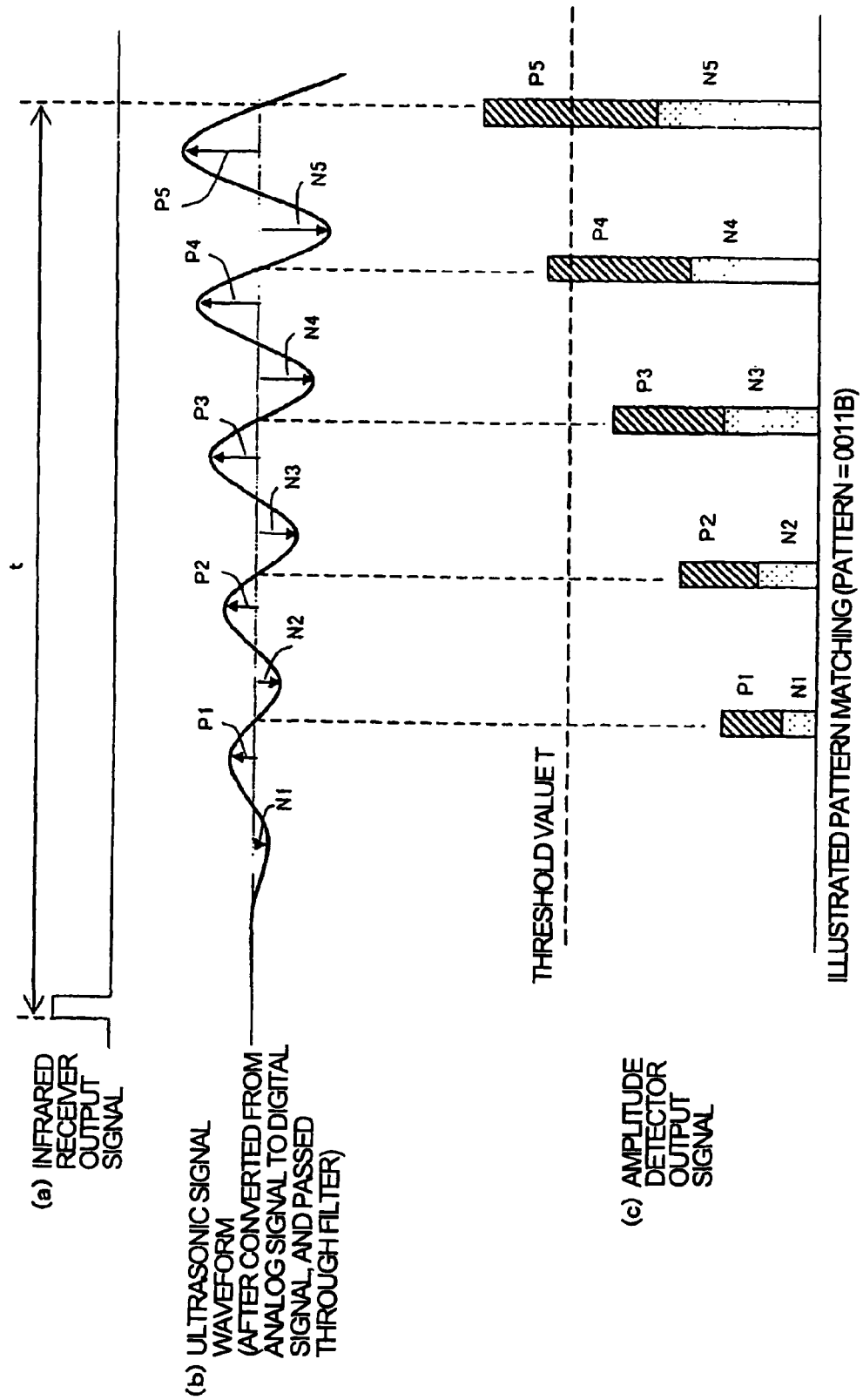
FIG. 6 is a diagram illustrative of a specific example of pattern matching.

FIG. 6 is illustrative of a specific example of pattern matching. FIG. 6 shows the output signal from infrared receiver 14 at (a), the output signal from inverting addition processor 11 at (b), and the output signal from amplitude detector 122 at (c). The output signal, which represents the received ultrasonic signal waveform, from inverting addition processor 11 is of sinusoidal waveform having alternate negative and positive levels which start with a negative level. The waveform shown in FIG. 6 includes first through fifth waves whose amplitude increases with time. N1 through N5 represent the peak values of negative amplitudes of the first through fifth waves. Peak values N1 through N5 are successively held by negative peak hold circuit 120b. P1 through P5 represent the peak values of positive amplitudes of the first through fifth waves. Peak values P1 through P5 are successively held by positive peak hold circuit 120a. The received ultrasonic signal waveform is shown as an analog signal waveform for illustrative purposes. However, the received ultrasonic signal is actually a sampled discrete signal.

As can be seen from the output signal from amplitude detector 122 shown at (c) in FIG. 6, when the first wave is received, amplitude detector 122 outputs a signal representing the amplitude value of "N1+P1". When the second wave is received, amplitude detector 122 outputs a signal representing the amplitude value of "N2+P2". When the third wave is received, amplitude detector 122 outputs a signal representing the amplitude value of "N3+P3". When the fourth wave is received, amplitude detector 122 outputs a signal representing the amplitude value of "N4+P4". When the fifth wave is received, amplitude detector 122 outputs a signal representing the amplitude value of "N5+P5". If it is assumed that the register values of respective registers 123a through 123d are represented by #1 through #4, respectively, then register values #1 through #4 change as follows:

When the first wave is received,
register value #1=N1+P1,
register value #2=reset,
register value #3=reset, and
register value #4=reset.
When the second wave is received,
register value #1=N2+P2,
register value #2=N1+P1,
register value #3=reset, and
register value #4=reset.
When the third wave is received,
register value #1=N3+P3,
register value #2=N2+P2,
register value #3=N1+P1, and
register value #4=reset.
When the fourth wave is received,
register value #1=N4+P4,
register value #2=N3+P3,
register value #3=N2+P2, and
register value #4=N1+P1.

When the fifth wave is received,
register value #1=N5+P5,
register value #2=N4+P4,
register value #3=N3+P3, and
register value #4=N2+P2.

According to the present specific example, the output signal "N4 +P4" produced by amplitude detector 12 when the fourth wave is received exceeds a threshold value T supplied from the threshold value setting unit 124. A 4-bit reference pattern of "0011" is supplied from pattern generator 125 to pattern matching unit 126. Pattern matching unit 126 generates a 4-bit comparative pattern where "1" occurs if the register value # is greater than the threshold value T and "0" occurs if the register value # is smaller than the threshold value T.

When the first, second, and third waves are received, pattern matching unit 126 does not generate a comparative pattern because some of the registers are reset. When the fourth wave is received, pattern matching unit 126 generates a comparative pattern of "0001", and determines whether the comparative pattern of "0001" matches the reference pattern of "0011". Since the comparative pattern of "0001" does not match the reference pattern of "0011", pattern matching unit 126 determines that no ultrasonic signal has been received. When the fifth wave is received, pattern matching unit 126 generates a comparative pattern of "0011", and determines whether the comparative pattern of "0011" matches the reference pattern of "0011". Since the comparative pattern of "0011" matches the reference pattern of "0011", pattern matching unit 126 determines that an ultrasonic signal has been received, and supplies an ultrasonic signal reception timing signal (pulse signal) to time measuring unit 13.

(3) Operation of Time Measuring Unit 13:

Time measuring unit 13 measures a time (t in FIG. 6) from the positive-going edge of the output signal from infrared receiver 14, i.e., the positive-going edge of an infrared signal reception timing pulse signal, until the positive-going edge of an ultrasonic signal reception timing pulse signal. Time t corresponds to the arrival time of the ultrasonic signal transmitted from the transmitting device, i.e., the time consumed until the ultrasonic signal transmitted by the transmitting device reaches the ultrasonic receiver.

According to the first embodiment described above, since the inverting addition processor and the reception timing determining circuit are in the form of digital circuits, they can easily be integrated, allowing the ultrasonic receiving device to be low in cost and small in size. In addition, the delay interval and the received ultrasonic frequency can be changed, the ultrasonic receiving device can be designed with greater freedom, smaller in size, and simpler in arrangement.

Pattern matching unit 126 determines ultrasonic signal reception timing according to the pattern matching process. Therefore, pattern matching unit 126 is less susceptible to noise. The reasons for making pattern matching unit 126 less susceptible to noise will be described below.

Generally, the ultrasonic receiver is similar in structure to a microphone. Consequently, the ultrasonic receiver tends to detect sporadic noise or a wide range of noise, e.g., voice, the sound of a closing door, or noise generated when a display monitor is turned on, etc. According to the conventional process of determining the reception of an ultrasonic signal when the amplitude value of the ultrasonic signal exceeds a threshold value, if any of these noises is contained in the output signal of the ultrasonic receiver, the amplitude value may be determined in error as exceeding the threshold value even when amplitude value is not actually in excess of the threshold value, and the time measuring unit may operate erroneously. According to the present embodiment, as shown in the specific example in FIG. 6, the comparative pattern is compared with the reference pattern to determine ultrasonic signal reception timing. If the output signal from the ultrasonic receiver contains sporadic noise or a wide range of noise, then since the comparative pattern does not match the reference pattern of "0011", time measuring unit 13 does not operate erroneously. Incidentally, if the reference pattern is represented by "0001", then time measuring unit 13 may possibly operate erroneously when the output signal from the ultrasonic receiver contains sporadic noise, and if the reference pattern is represented by "1111", then time measuring unit 13 may possibly operate erroneously when the output signal from the ultrasonic receiver contains a wide range of continuous noise.

According to the present embodiment, furthermore, the inverting addition processor adds the received ultrasonic signal as inverted and the ultrasonic signal delayed half phase or one phase from the received ultrasonic signal, thereby removing noise N as shown in FIG. 1. Therefore, it is possible to determine ultrasonic signal reception timing more accurately. According to the conventional process of determining the reception of an ultrasonic signal when the amplitude value of the ultrasonic signal exceeds a threshold value, since no inverted addition is performed, it is difficult to determine ultrasonic signal reception timing accurately due to noise N.

2nd Embodiment

In the ultrasonic receiving device according to the first embodiment, the received signal level in the ultrasonic receiver changes depending on the distance from itself to the transmitting device. If the transmitting device is in the form of a rod with an ultrasonic transmitter on its tip end, then the transmitting device has an ultrasonic signal radiating pattern which is lower in level at a rear end thereof. In this case, the received signal level in the ultrasonic receiver varies depending on the orientation of the transmitting device with respect to the ultrasonic receiver. Changes in the received signal level based on the distance and the orientation are liable to lower the accuracy of ultrasonic signal reception timing determined by pattern matching unit 126 in the ultrasonic receiving device according to the first embodiment which employs a fixed value as the threshold value. An ultrasonic receiving device according to a second embodiment employs a threshold value that is dynamically variable for increasing the accuracy of detected ultrasonic signal reception timing.

Figure 7:
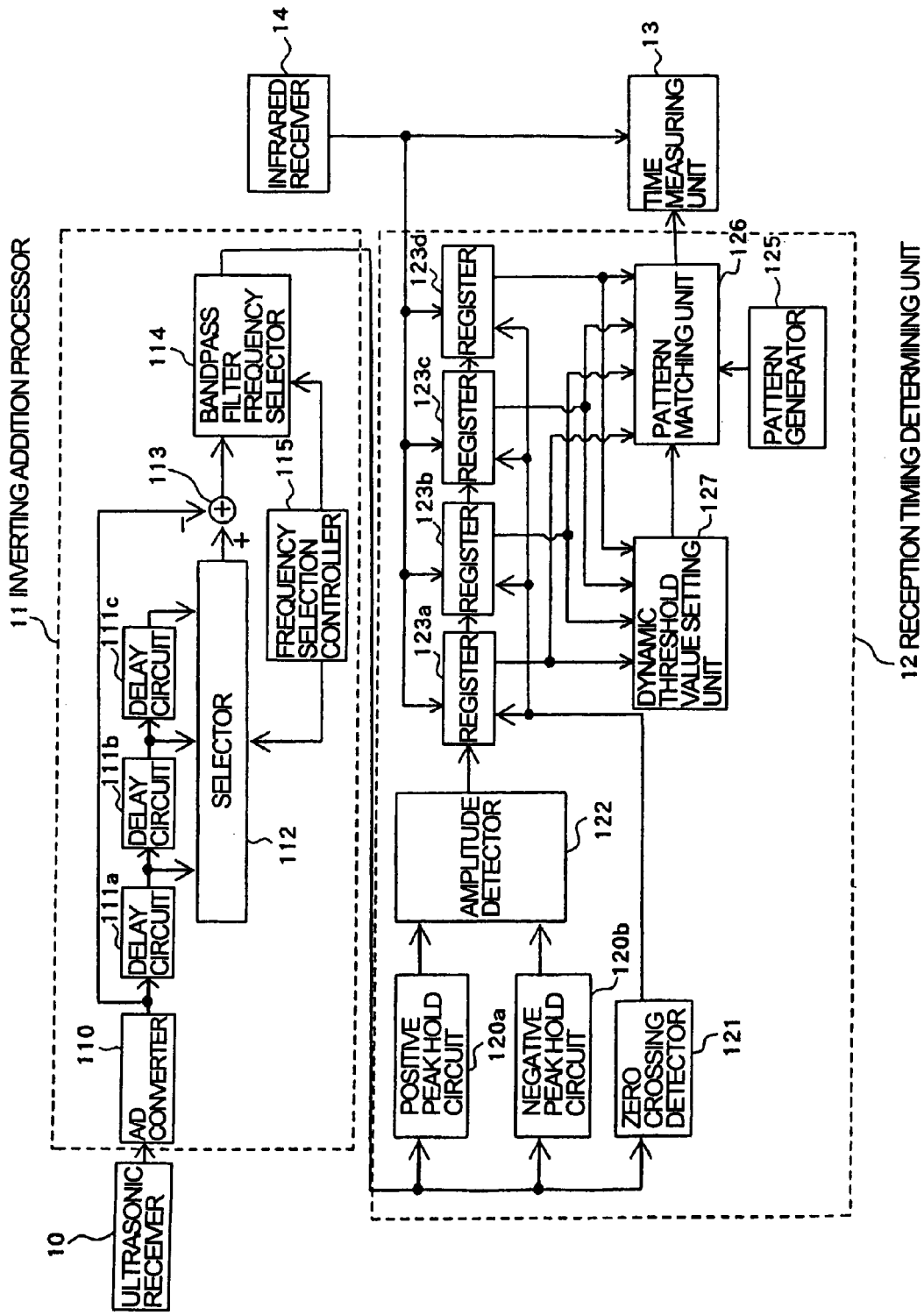
FIG. 7 is a block diagram of an ultrasonic receiving device according to a second embodiment of the present invention.

FIG. 7 shows in block form an ultrasonic receiving device according to a second embodiment of the present invention. The ultrasonic receiving device according to the second embodiment shown in FIG. 7 differs from the ultrasonic receiving device according to the first embodiment shown in FIG. 2 in that dynamic threshold value setting unit 127 is used in place of threshold value setting unit 124. Other details than dynamic threshold value setting unit 127 of ultrasonic receiving device according to the second embodiment are basically the same as those of the ultrasonic receiving device according to the first embodiment, and will not be described below. Operation of dynamic threshold value setting unit 127 will mainly be described below. It is assumed that pattern generator 125 generates a reference pattern of "0111".

Figure 8:
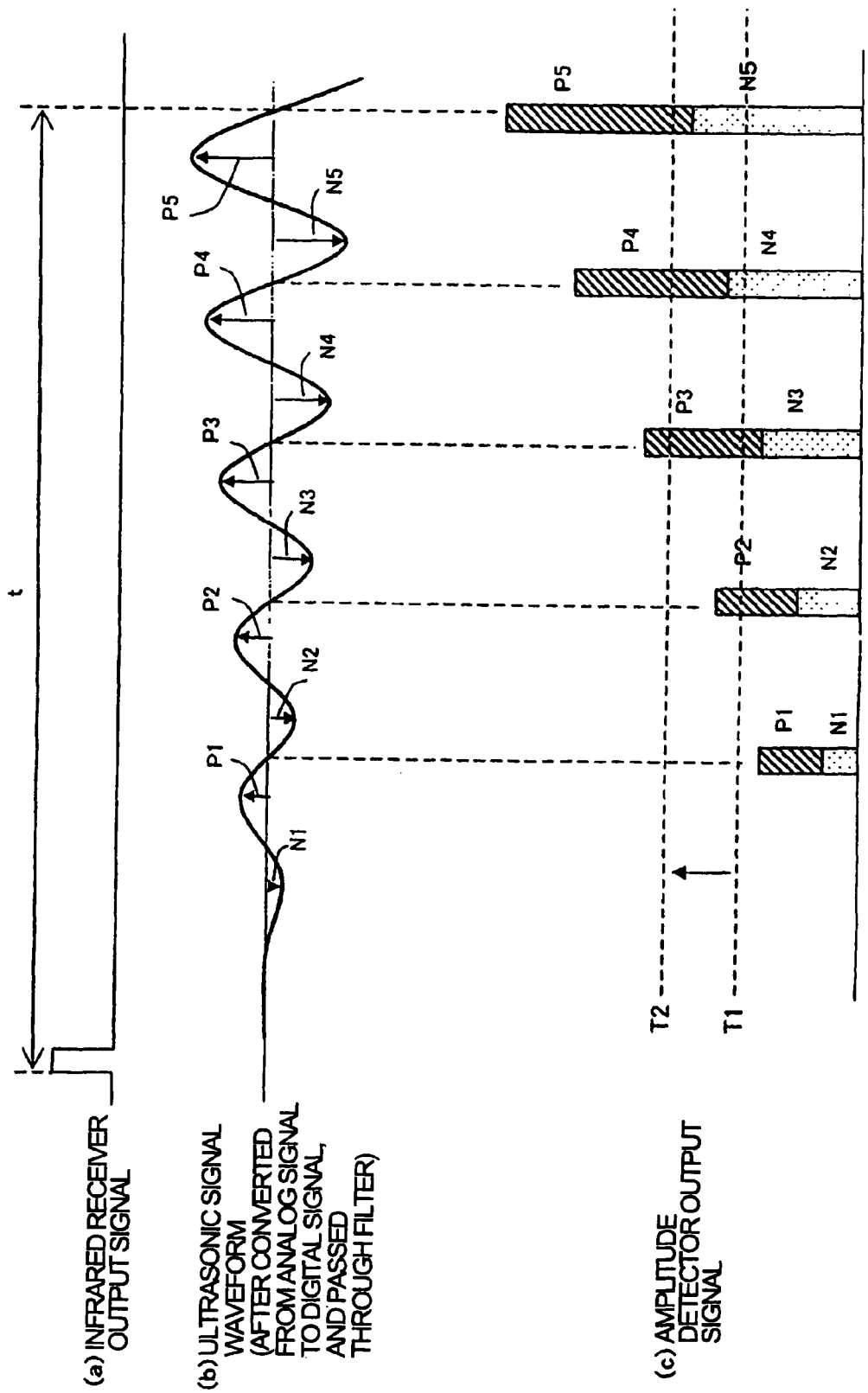
FIG. 8 is a diagram illustrative of a specific example of pattern matching in which a threshold value changes.

FIG. 8 shows a specific example of pattern matching in which a threshold value changes. As with the specific example shown in FIG. 6, when the fourth wave is received, register values #1 through #4 are given as follows:

register value #1=N4+P4,
register value #2=N3+P3,
register value #3=N2+P2, and
register value #4=N1+P1.

At this time, dynamic threshold value setting unit 127 supplies a preset threshold value T1 (fixed value) to pattern matching unit 126. Pattern matching unit 126 generates a comparative pattern by comparing the threshold value T1 with register values #1 through #4. The threshold value T1 is set to a minimum value that is low enough not to be affected by noise (noise N shown in FIG. 1) contained in the output signal from ultrasonic receiver 10.

If the received signal level in ultrasonic receiver 10 is sufficient, then since register value #3 of "N2+P2" is greater than the threshold value T1, pattern matching unit 126 generates a comparative pattern of "0111". Since the comparative pattern of "0111" matches the reference pattern of "0111", pattern matching unit 126 determines that an ultrasonic signal has been received, and outputs an ultrasonic signal reception timing signal to time measuring unit 13.

If the received signal level in ultrasonic receiver 10 is not sufficient, then since register value #3 of "N2+P2" is smaller than the threshold value T1, the comparative pattern does not match the reference pattern of "0111". For example, if the threshold value T1 is smaller than register value #1 of "N4+P4" and greater than register value #2 of "N3+P3", then a comparative pattern of "0001" is generated, and it does not match the reference pattern of "0111". Therefore, pattern matching unit 126 determines that no ultrasonic signal has been received.

If pattern matching unit 126 determines that no ultrasonic signal has been received as described above, when then the fifth wave is received, dynamic threshold value setting unit 127 sets a threshold value T2 based on the register values in the previous pattern matching cycle, i.e., when the fourth wave is received. Specifically, the threshold value T2 is set to a value greater than register value #3 of "N2+P2" and smaller than register value #2 "N3+P3" at the time the fourth wave is received.

When the fifth wave is received, register values #1 through #4 are given as follows:

register value #1=N5+P5,
register value #2=N4+P4,
register value #3=N3+P3, and
register value #4=N2+P2.

Pattern matching unit 126 compares these register values with the threshold value T2 set by dynamic threshold value setting unit 127, thereby generating a comparative pattern. Specifically, since register value #3 of "N3+P3" is greater than the threshold value T2, pattern matching unit 126 generates a comparative pattern of "0111". Since the comparative pattern of "0111" matches the reference pattern of "0111", pattern matching unit 126 determines that an ultrasonic signal has been received, and outputs an ultrasonic signal FIG. 9 shows a sequence for determining ultrasonic signal reception timing, as performed by pattern matching unit 126 shown in FIG. 7.

Figure 9:
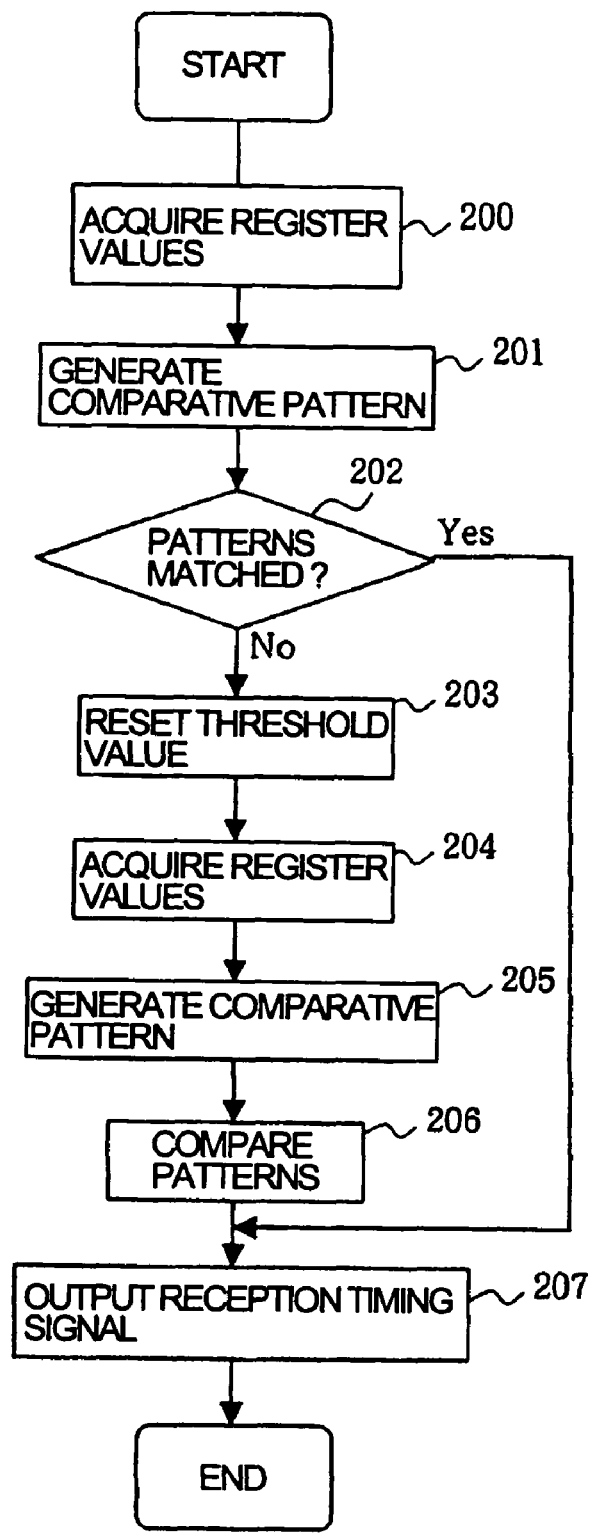
FIG. 9 is a flowchart of a sequence for determining ultrasonic signal reception timing, which is performed by the ultrasonic receiving device shown in FIG. 7.

As shown in FIG. 9, pattern matching unit 126 acquires the register values from respective registers 123a through 123d which have held the maximum values of amplitudes of the first through fourth waves, in step 200. Then, pattern matching unit 126 compares the acquired register values with the threshold value T1 supplied from dynamic threshold value setting unit 127, and generates a 4-bit comparative pattern of 0s and 1s where "0" occurs if the register value is smaller than the threshold value and "1" if the register value is greater than the threshold value, in step 201. Pattern matching unit 126 then determines whether the generated comparative pattern matches the 4-bit reference pattern supplied from pattern generator 125 in step 202.

If the comparative pattern does not match the reference pattern, then dynamic threshold value setting unit 127 resets a threshold value between the maximum value of the amplitude of a certain wave (the second wave in this case) of the first through fourth waves and the maximum value of the amplitude of a wave (the third wave in this case) received next. The value thus reset is the threshold value T2 shown in FIG. 8.

Then, pattern matching unit 126 acquires the register values from respective registers 123a through 123d which have held the maximum values of amplitudes of the second through fifth waves, in step 204. Then, pattern matching unit 126 compares the acquired register values with the threshold value T2 reset by dynamic threshold value setting unit 127, and generates a 4-bit comparative pattern in step 205. Pattern matching unit 126 then compares the generated comparative pattern with the 4-bit reference pattern supplied from pattern generator 125 in step 206. At this time, the comparative pattern matches the reference pattern without fail. Then, pattern matching unit 126 determines that an ultrasonic signal has been received, and outputs an ultrasonic signal reception timing signal (pulse signal) in step 207.

If the comparative pattern matches the reference pattern in step 202, then control jumps to step 207.

According to the sequence shown in FIG. 9, if the received signal level in ultrasonic receiver 10 is not sufficient, then the comparative pattern matches the reference pattern without fail in the second comparison cycle, and pattern matching unit 126 supplies an ultrasonic signal reception timing signal to time measuring unit 13. In this case, time measuring unit 13 measures the arrival time of the ultrasonic signal at the reception timing that is shifted one phase from the actual ultrasonic signal reception timing. It is possible to determine which wave the ultrasonic signal reception timing signal corresponds to by comparing the register values (amplitude values) held by pattern matching unit 126 after the preceding infrared signal has been received, with the present amplitude value. The time interval of one period of the ultrasonic signal is apparent. Therefore, the arrival time can be corrected. The reasons for this are that in an electronic presentation system to be described below, a variation in the amplitude of a received ultrasonic signal is caused by a change in the motion and inclination of an electronic pen operated by the user, and such a variation occurs slowly because the period of generation of the ultrasonic signal, i.e., the period of reception of the infrared signal, is shorter than the time in which the electronic pen is operated by the user. Consequently, the amplitude of the ultrasonic signal does not greatly increase or decrease after the preceding infrared signal has been received and after the present infrared signal has been received.

Figure 10:
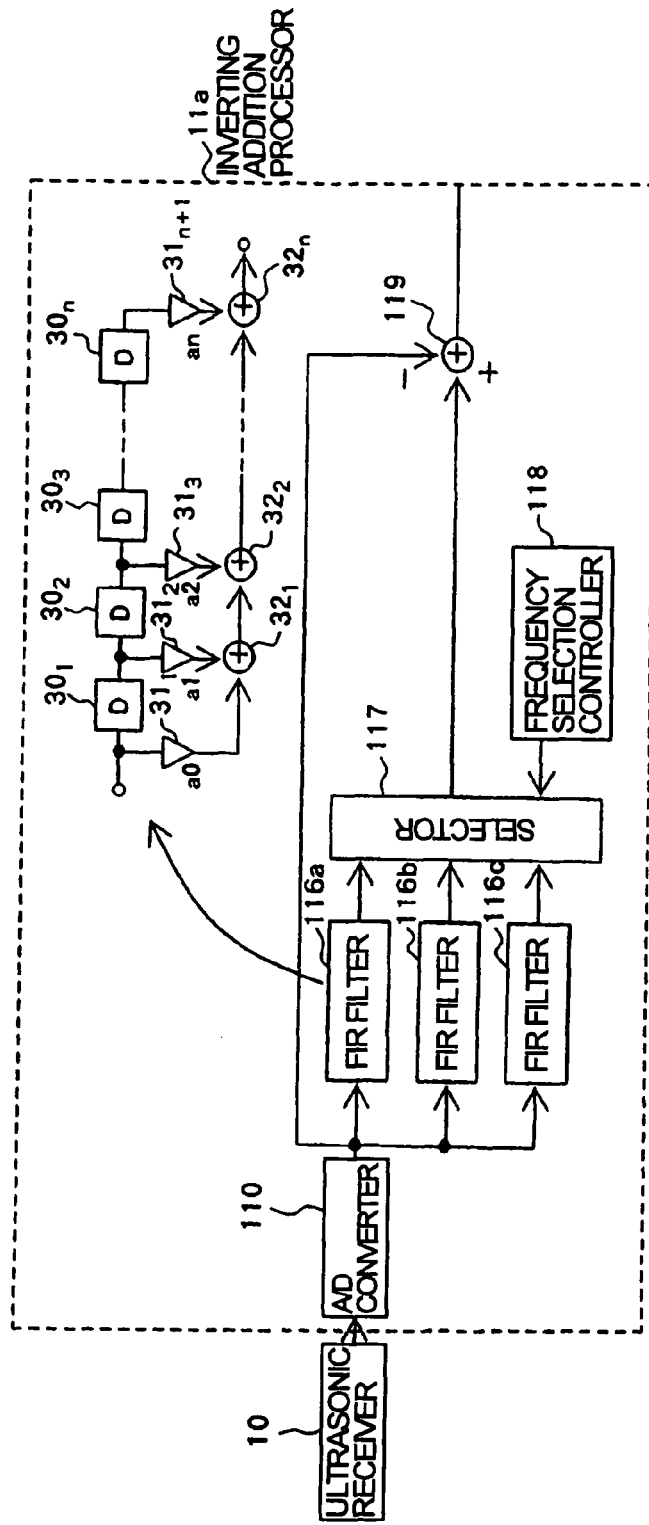
FIG. 10 is a block diagram of another inverting addition processor for use in the ultrasonic receiving device according to the present invention.

The embodiments described above are illustrated by way of example only, and structural and operational details thereof may be modified. For example, inverting addition processor 11 may be replaced with inverting addition processor 11a shown in FIG. 10. As shown in FIG. 10, inverting addition processor 11a comprises A/D converter 110, three FIR filters 116a, 116b, 116c, selector 117, frequency selection controller 118, and adder 119. A/D converter 110 supplies its output signal to a negative input terminal of adder 119 and also to FIR filters 116a, 116b, 116c. FIR filters 116a, 116b, 116c supply respective output signals to first, second, and third input terminals, respectively, of selector 117. Based on a frequency selection signal from frequency selection controller 118, selector 117 selects either one of the signals supplied to its first through third input terminals and outputs the selected signal to a positive input terminal of adder 119. Adder 119 adds the output signal from A/D converter 110 and the output signal from selector 117 to each other. Adder 119 supplies its output sum signal to the reception timing determining circuit shown in FIG. 2 or FIG. 7.

Each of FIR filters 116a, 116b, 116c has a structure shown in an upper portion of FIG. 10. Specifically, each of FIR filters 116a, 116b, 116c comprises a series-connected array of n delay circuits $30_1$ through $30_n$, (n+1) amplifiers $31_1$ through $31_{n+1}$, and a series-connected array of n adders $32_1$ through $32_n$. Amplifiers $31_1$ through $31_{n+1}$ have respective input terminals connected to respective input lines of delay circuits $30_1$ through $30_n$. Amplifier $31_{n+1}$ has an input terminal connected to an output line of delay circuit $30_n$. Amplifiers $31_1$ through $31_{n+1}$ have respective output terminals connected respectively to input terminals of adders $32_1$ through $32_n$. Adder $32_1$ has another input terminal connected the output terminal of amplifier $31_1$. Adders $32_2$ through $32_n$ have other input terminals connected respectively to the output terminals of preceding adders $32_1$ through $32_{n-1}$.

Inverting addition processor 11a constructed as described above operates in the same manner as inverting addition processor 11 shown in FIG. 2 or FIG. 7. Inverting addition processor 11a is illustrated as having three FIR filters 116a through 116c. However, Inverting addition processor 11a may be designed to have more or less FIR filters.

In the second embodiment, the reference pattern may be of other than "0111". For example, the reference pattern may be of "0011". In this case, in the specific example shown in FIG. 8, the threshold value T2 is set so as to be greater than the amplitude value of the third wave and smaller than the amplitude value of the fourth wave.

The threshold value T may also be set to an intermediate value between the amplitude value of the second wave and the amplitude value of the third wave after the preceding infrared signal has been received. Stated otherwise, when an ultrasonic signal reception timing signal is generated, a new threshold value T may be prepared in advance for the reception of a next infrared signal.

An electronic presentation system which incorporates the ultrasonic receiving device according to the present invention will be described below.

Figure 11:
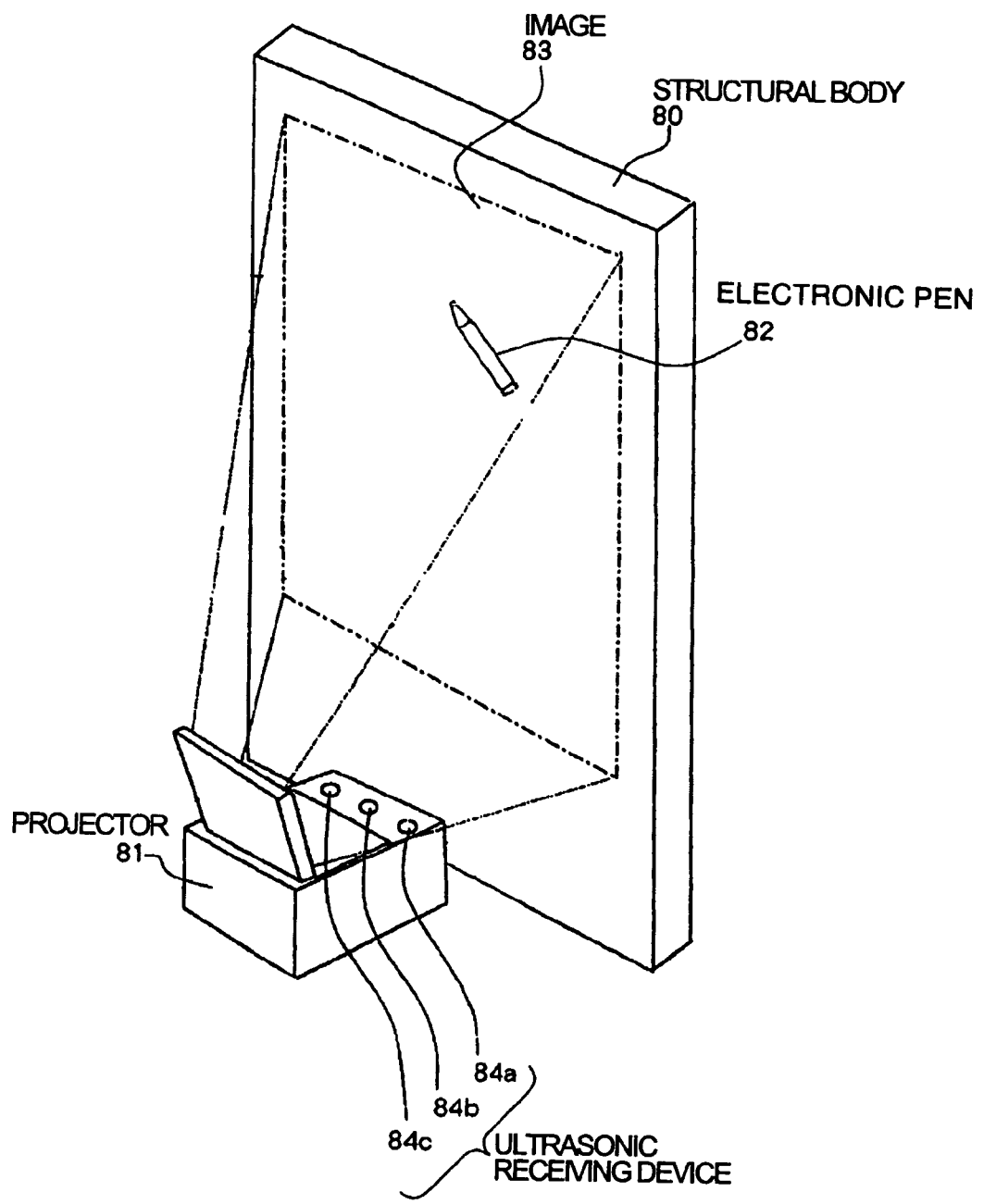
FIG. 11 is a perspective view of an electronic presentation system incorporating the ultrasonic receiving device according to the present invention.

FIG. 11 shows in perspective an electronic presentation system which incorporates the ultrasonic receiving device according to the present invention. As shown in FIG. 11, the electronic presentation system comprises projector 81 having a plurality of ultrasonic receiving devices 84a, 84b, 84c, and electronic pen 82 for entering information such as characters or the like on image 83 that is projected from projector 81 onto a structural body 80 such as a wall or the like.

Electronic pen 82 has on its tip end an ultrasonic transmitter for transmitting an ultrasonic signal, an infrared transmitter for transmitting an infrared signal, and a switch. When the tip end of electronic pen 82 is pressed against structural body 80, the switch is turned on. At the same time that the switch is turned on, the ultrasonic transmitter and the infrared transmitter start transmitting an ultrasonic signal and an infrared signal, respectively. The ultrasonic transmitter and the infrared transmitter continuously transmit the ultrasonic signal and the infrared signal, respectively, while the switch is being turned on.

Each of ultrasonic receiving devices 84a, 84b, 84c comprises the ultrasonic receiving device according to the first embodiment or the second embodiment, and receives the ultrasonic signal and the infrared signal that are transmitted from electronic pen 82. Each of ultrasonic receiving devices 84a, 84b, 84c performs the pattern comparison as shown in FIG. 6 or FIG. 8, and measures the arrival time of the ultrasonic signal from electronic pen 82. The measured results are supplied to a processing circuit (CPU) of projector 81, which detects the position of the tip end of electronic pen 82 on projected image 83 according to a triangulation method based on the measured results from ultrasonic receiving devices 84a, 84b, 84c. The detected position of the tip end of electronic pen 82 is displayed as a marker on projected image 83.

Since the ultrasonic signal radiating pattern of electronic pen 82 is lower in level at the rear end thereof, each of ultrasonic receiving devices 84a, 84b, 84c should preferably comprise the ultrasonic receiving device according to the second embodiment.

The electronic presentation system shown in FIG. 11 is illustrated as having three ultrasonic receiving devices. However, the electronic presentation system may be desired to have more or less ultrasonic receiving devices insofar as they can detect the position of the electronic pen.

The ultrasonic receiving device according to the present invention is not limited to being incorporated in the electronic presentation system, but may be incorporated in any of various apparatus or systems for measuring the arrival time of an ultrasonic signal.

Though the ultrasonic signal has been described with respect to the process of determining signal reception timing based on pattern matching according to the present invention, the process is also applicable to general sound signals (including ultrasonic signals) or general wave signals. In addition, though the infrared signal has been described with respect to the process, the process is also applicable to general electromagnetic wave signals.

In each of the embodiments, it is determined that an ultrasonic signal has been received when the comparative pattern and the reference pattern fully match each other. However, the ultrasonic receiving device may be arranged to determine that an ultrasonic signal has been received when portions the comparative pattern and the reference pattern match each other.

While preferred embodiments of the present invention have been described using specific terms, such description is for illustrative purposes only, and it is to be understood that changes and variations may be made without departing from the spirit or scope of the following claims.

What is claimed is:

1. A wave receiving device for receiving a wave signal having a period in which an amplitude thereof progressively increases as time elapses, the wave receiving device comprising:
   a receiver for receiving the wave signal; and
   a determining unit for determining that said receiver has successfully received said wave signal based on a comparative pattern which is generated as a result of a comparison between respective amplitude values of a plurality of successive waves of said wave signal received by said receiver and a threshold value,
   wherein said determining unit comprises:
      a shift register for successively holding the amplitude values of the successive waves of said wave signal, said shift register comprising a plurality of series-connected registers;
      a pattern matching unit for generating said comparative pattern based on the comparison between the amplitude values held by said shift register and said threshold value, and determining that said receiver has successfully received said wave signal when the generated comparative pattern matches said reference pattern; and
      a dynamic threshold setting unit for resetting said threshold value between the amplitude values, held bid shift register, of one of said successive waves and the amplitude value, held by said shift register, of a next one of said successive waves, when said comparative pattern does not match said reference pattern.

2. The wave receiving device according to claim 1, wherein said one of the successive waves comprises a second one of the successive waves, which is received by said receiver during said period.

3. The wave receiving device according to claim 1, wherein said wave signal comprises a sound signal,
   wherein the wave signal having a period in which the amplitude thereof progressively increases as time elapses, as compared from one cycle to a next cycle of the wave signal, and
   wherein the amplitude values are held by a memory unit for comparing with the threshold, the memory unit successively holding the amplitude values of the successive waves of said wave signal, the memory comprising a plurality of series-connected memory units holding each of the amplitude values according to a timing signal from a zero crossing detector for detecting a zero crossing point of the wave signal from a negative level to a positive level.

4. The wave receiving device according to claim 1, wherein said wave signal comprises an ultrasonic signal, and
   wherein the wave signal having a period in which the peak amplitude thereof progressively increases as time elapses, and
   wherein an amplitude value is according to a positive peak of the wave signal received from a positive peak hold circuit and a negative peak of the wave signal received from a negative peak hold circuit.

5. The wave receiving device according to claim 1, further comprising:
   an electromagnetic signal receiver for receiving an electromagnetic signal which is transmitted simultaneously with said wave signal from an external transmitting device which transmits said wave signal; and
   a time measuring unit for measuring a period of time after said electromagnetic signal receiver has received said electromagnetic signal until said determining unit determines that said receiver has successfully received said wave signal.

6. The wave receiving device according to claim 5, wherein said electromagnetic signal comprises an infrared signal.

7. The electronic presentation system comprising:
   a projector including a plurality of wave receiving devices, each of the wave receiving devices according to claim 5; and
   a pointing device for transmitting the wave signal and the electromagnetic signal;
   wherein each of said wave receiving devices measures a period of time until the wave signal transmitted from said pointing device arrives at the wave receiving device based on times at which the wave receiving device has received said wave signal and said electromagnetic signal.

8. The electronic presentation system according to claim 7, wherein said electromagnetic signal comprises an infrared signal.

9. A wave receiving device for receiving a wave signal having a period in which an amplitude thereof progressively increases as time elapses, the wave receiving device comprising:
a receiver for receiving the wave signal; and
a determining unit for determining, that said receiver has successfully received said wave signal based on a result of a comparison between a comparative pattern and a reference pattern, said comparative pattern being generated as a result of comparison between respective amplitude values of a plurality of successive waves of said wave signal received by said receiver and a threshold value,
wherein said determining unit comprises:
a shift register for successively holding the amplitude values of the successive waves of said wave signal, said shift register comprising a plurality of series-connected register;
a pattern matching unit for generating said comparative pattern based on the comparison between the amplitude values held by said shift register and said threshold value, and determining that said receiver has successfully received said wave signal when the generated comparative pattern matches said reference pattern; and
a dynamic threshold setting unit for resetting said threshold value between the amplitude values, by said shift register, of one of said successive waves and the amplitude value, held by said shift register, of a next one of said successive waves when said comparative pattern does not match said reference pattern.

10. The wave receiving device according to claim 9, wherein said wave signal comprises a sound signal.

11. The wave receiving device according to claim 9, wherein said wave signal comprises an ultrasonic signal.

12. The wave receiving device according to claim 9, further comprising:
an electromagnetic signal receiver for receiving an electromagnetic signal which is transmitted simultaneously with said wave signal from an external transmitting device which transmits said wave signal; and
a time measuring unit for measuring a period of time aider said electromagnetic signal receiver has received said electromagnetic signal until said determining unit determines that said receiver has successfully received said wave signal.

13. The wave receiving device according to claim 12, wherein said electromagnetic signal comprises an infrared signal.

14. The electronic presentation system comprising:
a projector including a plurality of wave receiving devices with each of the wave receiving devices according to claim 12; and
a pointing device for transmitting the wave signal and the electromagnetic signal;
wherein each of said wave receiving devices measures a period of time until the wave signal transmitted from said pointing device arrives at the wave receiving device based on times at which the wave receiving device has received said wave signal and said electromagnetic signal.

15. The electronic presentation system according to claim 14, wherein said electromagnetic signal comprises an infrared signal.

16. A wave receiving device for receiving a wave signal having a period in which an amplitude thereof progressively increases as time elapses as compared from one cycle to a next cycle of the wave signal, the wave receiving device comprising:
a receiver for receiving the wave signal; and
a determining unit for determining whether at least a portion of a comparative pattern matches a reference pattern, said comparative pattern being generated as a result of comparison between respective amplitude values of a plurality of successive waves of said wave signal received by said receiver and a threshold value, and determining that said receiver has successfully received said wave signal when the at least the portion of said comparative pattern matches said reference pattern,
wherein said determining unit comprises:
a shift register for successively holding the amplitude values of the successive waves of said wave signal said shift register comprising a plurality of series-connected registers;
a pattern matching unit for generating said comparative pattern based on the comparison between the amplitude values held by said shift register and said threshold value, and determining that said receiver has successfully received said wave signal when the generated comparative pattern matches said reference pattern; and
a dynamic threshold setting unit for resetting said threshold value between the amplitude values, held by said shift register, of one of said successive waves and the amplitude value held by id shift register, a next one of said successive, when said comparative pattern does not match said reference pattern.

17. The wave receiving device according to claim 16, further comprising:
an inverting addition processor for adding an original signal which is inverted from the wave signal received and output by said receiver and a signal which is delayed a half phase or one phase from said wave signal to each other; producing a sum signal, and supplying said sum signal to said determining unit.

18. The wave receiving device according to claim 17, wherein said inverting addition processor and said determining unit comprise digital circuits, respectively.

19. The wave receiving device according to claim 16, wherein said wave signal comprises a sound signal.

20. The wave receiving device according to claim 16, wherein said wave signal comprises an ultrasonic signal.

21. The wave receiving device according to claim 16, further comprising:
an electromagnetic signal receiver for receiving an electromagnetic signal which is transmitted approximately simultaneous with said wave signal from an external transmitting device which transmits said wave signal; and
a time measuring unit for measuring a period of time after said electromagnetic signal receiver has received said electromagnetic signal until said determining unit determines that said receiver has successfully received said wave signal.

22. The wave receiving device according to claim 21, wherein said electromagnetic signal comprises an infrared signal.

23. The electronic presentation system comprising:
a projector including a plurality of wave receiving devices, and each one of the wave receiving devices according to claim 21; and
a pointing device for transmitting the wave signal and the electromagnetic signal;

wherein each of said wave receiving devices measures a period of time until the wave signal transmitted from said pointing device arrives at the wave receiving device based on times at which the wave receiving device has received said wave signal and said electromagnetic signal.

24. The electronic presentation system according to claim 23, wherein said electromagnetic signal comprises an infrared signal.

25. A method of determining wave reception, the method comprising:

receiving a wave signal including a period in which an amplitude thereof progressively increases as time elapses as compared from one cycle to a next cycle of the wave signal; and determining that said wave signal has successfully been received based on a comparative pattern which is generated as a result of comparison between respective amplitude values of a plurality of successive waves of said wave signal which is received and a threshold value, wherein said determining comprises:

successively holding, by a shift register, the amplitude values of the successive waves of said wave signal, said shift register comprising a plurality of series-connected registers;

generating, by a pattern matching unit, said comparative Pattern based on the comparison between the amplitude values held by said shift register and said threshold value, and determining that said receiver has successfully received said wave signal when the generated comparative pattern matches said reference pattern; and resetting, by a dynamic threshold setting unit, said threshold value between the amplitude values, held by said shift register, of one of said successive waves and the amplitude value, held by said shift register, of a next one of said successive waves, when said comparative pattern does not match said reference pattern.

26. The method according to claim 25, wherein said wave signal comprises a sound signal, and determining whether the comparative pattern correlates with a reference pattern comprises determining whether the comparative pattern matches the reference pattern.

27. The method according to claim 25, wherein said wave signal comprises an ultrasonic signal.

28. A method of determining wave reception, comprising:

receiving a wave signal having a period in which a peak amplitude thereof progressively increases as time elapses;

comparing a comparative pattern and a reference pattern with each other, said comparative pattern being generated as a result of comparison between respective amplitude values of a plurality of successive waves of said wave signal which is received and a threshold value, wherein said comparing comprises:

successively holding the amplitude values of the successive waves of said wave signal, said shift register comprising a plurality of series-connected registers; and generating said comparative pattern based on the comparison between the amplitude values held by said shift register and said threshold value;

determining that said wave signal has successfully been received based on a result of the comparing, wherein said determining that said receiver has successfully received said wave signal comprises when the generated comparative pattern matches said reference pattern; and resetting said threshold value between the amplitude values, held by said shift register, of one of said successive waves and the amplitude value, held by said shift register, of a next one of said successive waves, when said comparative pattern does not match said reference pattern.

29. The method according to claim 28, wherein said wave signal comprises a sound signal.

30. The method according to claim 28, wherein said wave signal comprises an ultrasonic signal.

31. A method of determining wave reception, the method comprising:

receiving a wave signal including a period in which an amplitude thereof progressively increases as time elapses;

determining whether a comparative pattern correlates with a reference pattern or not, said comparative pattern being generated as a result of comparison between respective amplitude values of a plurality of successive waves of said wave signal which is received and a threshold value;

determining that said wave signal has successfully been received when said comparative pattern correlates with said reference pattern;

successively holding the amplitude values of the successive waves of said wave signal in a shift register comprising a plurality of series-connected registers;

generating said comparative pattern based on a comparison between the amplitude values held by said shift register and said threshold value; and resetting said threshold value between the amplitude value, held by said shift register, of one of said successive waves and the amplitude value, held by said shift register, of a next one of said successive waves, when said comparative pattern does not match said reference pattern.

32. The method according to claim 31, wherein said one of the successive waves comprises a second one of the successive waves which is received during said period.

33. The method according to claim 31, wherein said wave signal comprises a sound signal.

34. The method according to claim 31, wherein said wave signal comprises an ultrasonic signal.

* * * * *